United States Patent
Bazzica

(10) Patent No.: US 10,213,942 B2
(45) Date of Patent: Feb. 26, 2019

(54) METHOD OF LOADING AND UNLOADING A MOLD ON A FOAM PLASTICS MOLDING MACHINE

(71) Applicant: Bazzica Engineering S.r.l., Trevi (IT)

(72) Inventor: Carlo Bazzica, Matigge di Trevifoligno (IT)

(73) Assignee: BAZZICA ENGINEERING S.R.L., Trevi (IT)

( * ) Notice: Subject to any disclaimer, the term of this patent is extended or adjusted under 35 U.S.C. 154(b) by 278 days.

(21) Appl. No.: 15/287,351

(22) Filed: Oct. 6, 2016

(65) Prior Publication Data

US 2017/0021531 A1 Jan. 26, 2017

Related U.S. Application Data

(63) Continuation of application No. 13/808,455, filed as application No. PCT/IB2011/001584 on Jul. 8, 2011, now Pat. No. 9,469,051.

(30) Foreign Application Priority Data

Jul. 8, 2010 (IT) .............................. TO2010A0594

(51) Int. Cl.
*B29C 33/30* (2006.01)
*B29C 31/00* (2006.01)
(Continued)

(52) U.S. Cl.
CPC .......... *B29C 33/305* (2013.01); *B29C 31/006* (2013.01); *B29C 33/303* (2013.01);
(Continued)

(58) Field of Classification Search
CPC ... B29C 33/305; B29C 44/428; B29C 31/006; B29C 33/303; B29C 33/30; B29C 45/1742; B29C 45/2675
See application file for complete search history.

(56) References Cited

U.S. PATENT DOCUMENTS

| 3,642,398 A | 2/1972 | Von Rudgisch |
| 3,871,801 A | 3/1975 | Buchmann |

(Continued)

FOREIGN PATENT DOCUMENTS

| DE | 3801032 | 7/1989 |
| EP | 0 968 805 | 1/2000 |

OTHER PUBLICATIONS

PCT Request (Form PCT/RO/101) for International Application No. PCT/IB2011/001584 dated Jul. 8, 2011.
(Continued)

*Primary Examiner* — Yogendra N Gupta
*Assistant Examiner* — Emmanuel S Luk
(74) *Attorney, Agent, or Firm* — Neal, Gerber & Eisenberg LLP

(57) ABSTRACT

On a foam plastics molding machine, a molding unit, defined by a mold and an interface frame equipped with a number or quantity of plastic molding material and operating fluid inlets, is loaded into a raised window in a fixed frame of the machine by positioning the molding unit in a fixed position on a trolley; positioning the trolley astride a fixed platform; raising the platform so that vertical ribs on the interface frame slidably engage corresponding vertical guides forming part of the machine and on a level with the window; connecting the guides to the ribs; and moving the guides towards the window.

11 Claims, 6 Drawing Sheets

(51) Int. Cl.
 B29C 45/17    (2006.01)
 B29C 44/42    (2006.01)
 B29C 45/26    (2006.01)
(52) U.S. Cl.
 CPC ........ *B29C 44/428* (2013.01); *B29C 45/1742* (2013.01); *B29C 45/2675* (2013.01)

(56) References Cited

U.S. PATENT DOCUMENTS

| | | |
|---|---|---|
| 4,648,825 A | 3/1987 | Heil et al. |
| 5,186,958 A | 2/1993 | Schmidt |
| 5,351,744 A | 10/1994 | Larsson |
| 5,733,582 A | 3/1998 | Johnson |
| 6,227,835 B1 | 5/2001 | Bazzica |
| 7,128,564 B2 | 10/2006 | Di Simone |
| 7,500,840 B2 | 3/2009 | Zenpo et al. |
| 2006/0160684 A1 | 7/2006 | Springston et al. |
| 2008/0029921 A1 | 2/2008 | Corradi et al. |
| 2008/0284051 A1 | 11/2008 | Corradi |
| 2016/0023413 A1* | 1/2016 | Tomoto .............. B29D 30/0605 425/28.1 |
| 2016/0176090 A9* | 6/2016 | Sudermann ......... B29C 45/2673 264/39 |

OTHER PUBLICATIONS

Notification Concerning Submission, Obtention or Transmittal of Priority Document (Form PCT/IB/304) for International Application No. PCT/IB2011/001584 dated Oct. 21, 2011.
International Search Report and Written Opinion for International Application No. PCT/IB2011/001584 dated Nov. 29, 2011.

* cited by examiner

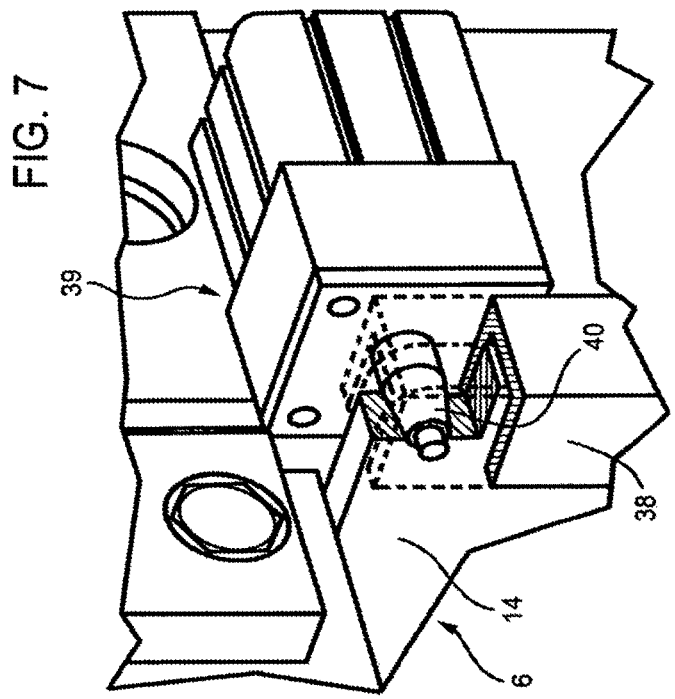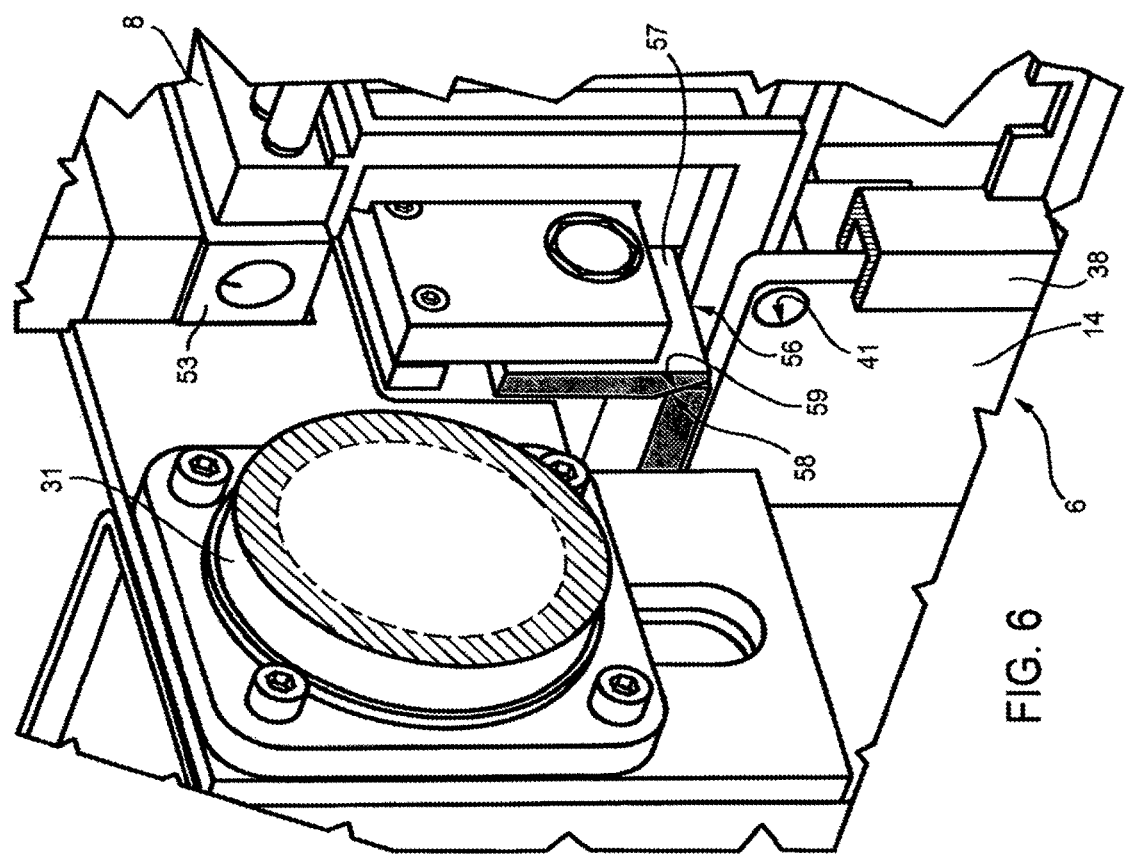

METHOD OF LOADING AND UNLOADING A MOLD ON A FOAM PLASTICS MOLDING MACHINE

PRIORITY CLAIM

This application is a continuation of, claims the benefit of and priority to U.S. patent application Ser. No. 13/808,455, filed on Mar. 15, 2013, which is a national stage application of PCT/IB011/001584, filed on Jul. 8, 2011, which claims the benefit of and priority to Italian Patent Application No. TO2010A000594, filed on Jul. 8, 2010, the entire contents of which are each incorporated by reference herein.

BACKGROUND

In certain foam plastics molding, a machine, as described for example in the Applicant's EP-A-0 968 805, is known comprising a fixed frame with a window, higher than the machine supporting surface, for receiving the mold; and the mold, comprising two interlocked half-molds, is loaded onto the machine in a loading sequence comprising:
- a first step of setting up and connecting a machine-mold interface frame to the mold to form a molding unit, which comprises the mold and interface frame, and has a number or quantity of plastic molding material and operating fluid inlets;
- a second step of advancing the molding unit towards the fixed frame;
- a third step of lifting the molding unit to window level; and
- a fourth step of loading the molding unit into a work position physically and functionally engaging the fixed frame at the window, and in which the molding unit is locked to the fixed frame.

In the work position, the mold is connected automatically to feed lines supplying granular plastic material and operating fluids, such as compressed air and steam.

In the work position, the half-molds are made movable with respect to each other by locking a first half-mold, connected to the feed lines, to a fixed frame of the machine at the window; locking a second half-mold to a movable frame of the machine facing the window; making the two half-molds free to move with respect to each other; and moving the movable frame to and from the fixed frame in a given operating sequence.

One of the main problems of known molding machines of the above type is loading the molding unit accurately onto a lift movable vertically on the machine to perform the third step described above.

In this connection, it should be appreciated that a molding unit can weigh several tons, is always off-balanced (when suspended, is always tilted with respect to the vertical), and, when attached to the lift, assumes with respect to the machine a precise final work position which, except for the movements of the molding unit on the machine at the third and fourth steps, remains substantially unchanged throughout the operating cycle of the machine. Attaching the molding unit to the lift therefore involves an indefinite number (varying from one unit to another) of setting and balancing operations, which are not only time-consuming, but must be performed with the machine off, and, in the case of medium production runs, may cut the output capacity of the machine by as much as half.

SUMMARY

The present disclosure relates to a method of loading and unloading a mold on a foam plastics molding machine.

It is an object of the present disclosure to provide a method of loading and unloading a mold on a foam plastics molding machine, configured to eliminate certain of the above described drawbacks.

According to one embodiment of the present disclosure, there is provided a method of loading and unloading a mold on a foam plastics molding machine comprising a fixed frame having a window for receiving the mold and located at a higher level than the supporting surface of the machine, wherein loading the mold onto the machine comprising: a first step of setting up and connecting to the mold an interface frame interfacing the machine and the mold, to form a molding unit, which comprises the mold and relative interface frame, and has a number of plastic molding material and operating fluid inlets; a second step of advancing the molding unit towards the fixed frame; a third step of lifting the molding unit to the level of the window; and a fourth step of loading the molding unit into a work position physically and functionally engaging the fixed frame at the window; and locking the molding unit to the fixed frame by a locking device; wherein the second step comprises the sub-steps of: positioning the molding unit in a given fixed first position on the bed of a trolley; and moving the trolley into a position astride a platform defining a horizontal supporting surface for the bed of the trolley; and the third step comprises lifting the molding unit resting on the trolley, and comprises the sub-steps of: raising the platform, so that vertical ribs on the interface frame, which is positioned in the given first position on the trolley, slidably engage corresponding vertical guides on the machine, locking the ribs to the relative guides by a locking device, when the molding unit is positioned coaxial with the window; and releasing the molding unit on the guides by lowering the platform and the trolley to detach the trolley from the molding unit.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which:

FIGS. 6 and 7 show respective larger-scale details of the FIG. 1 machine.

DETAILED DESCRIPTION

Figure 5:
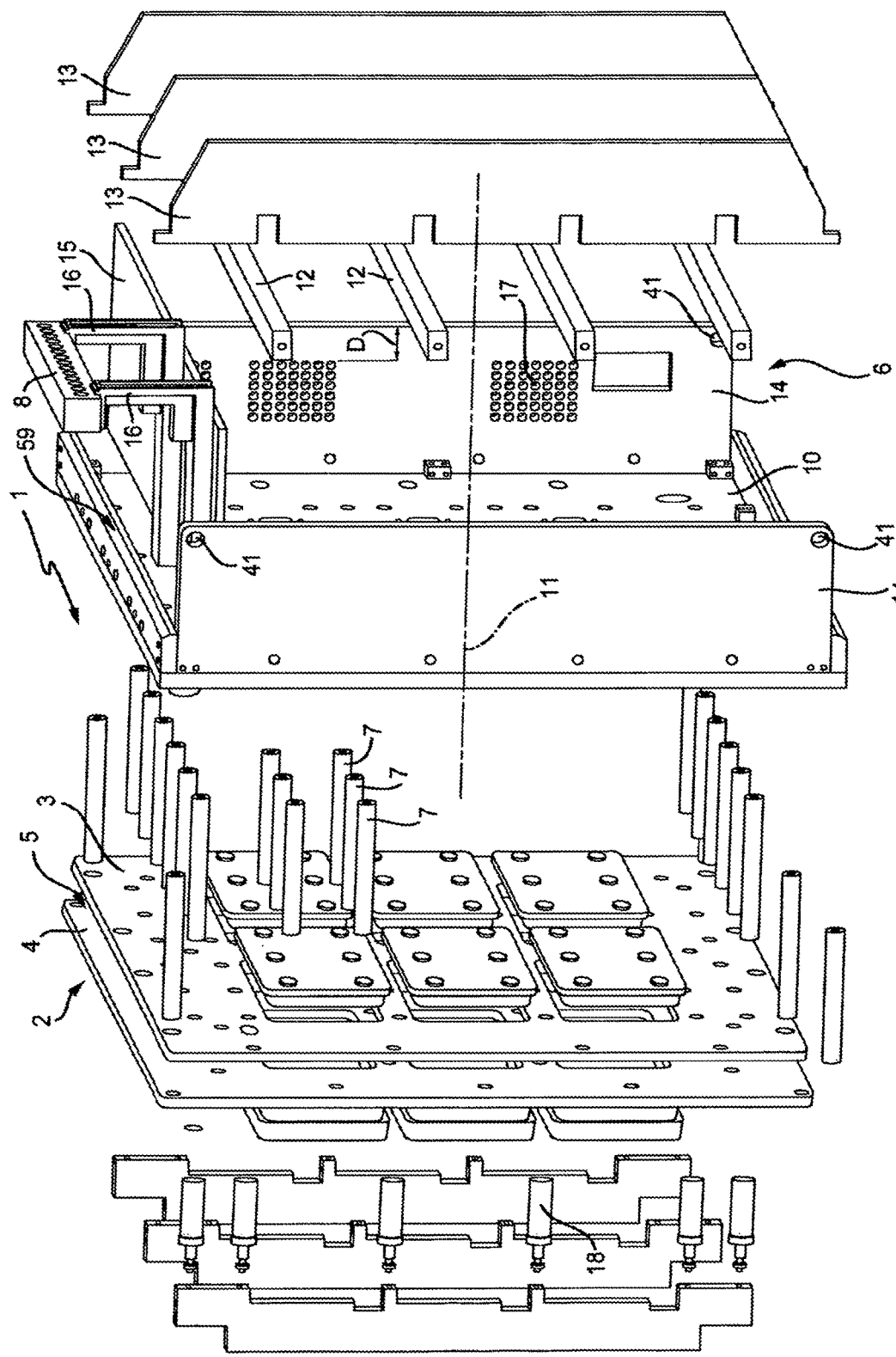
FIG. 5 shows an exploded view in perspective of a second detail of FIG. 1.

Referring now to the example embodiments of the present disclosure illustrated in FIGS. 1 to 7, number 1 in FIG. 5 indicates as a whole a molding unit comprising a mold 2, in turn comprising two facing half-molds 3 and 4 defining a chamber 5 for molding foam plastic material. Molding unit 1 also comprises a frame 6 connected integrally to half-mold 3 by a number or quantity of tubular stays 7, and in turn comprising a first number or quantity of top front connectors 8 connected to molding chamber 5 by part of tubular stays 7 to feed plastic molding material into molding chamber 5;

and a second number or quantity of lateral front connectors 9 (seen in FIGS. 1 and 3) connected to molding chamber 5 by a further part of tubular stays 7 to feed operating fluids (compressed air, water, etc.) into molding chamber 5.

Frame 6 comprises a plate 10, which faces half-mold 3, is connected to half-mold 3 by tubular stays 7, is perpendicular to a longitudinal axis 11 of mold 2, and comprises, on the opposite side to that facing half-mold 3, a number or quantity of reinforcing cross members 12 positioned, like axis 11, substantially horizontally in use; a number or quantity of reinforcing wings 13 perpendicular to cross members 12 and to axis 11, and positioned substantially vertically in use; and two ribs 14 parallel to wings 13 and extending along respective lateral edges of plate 10.

Figure 3:
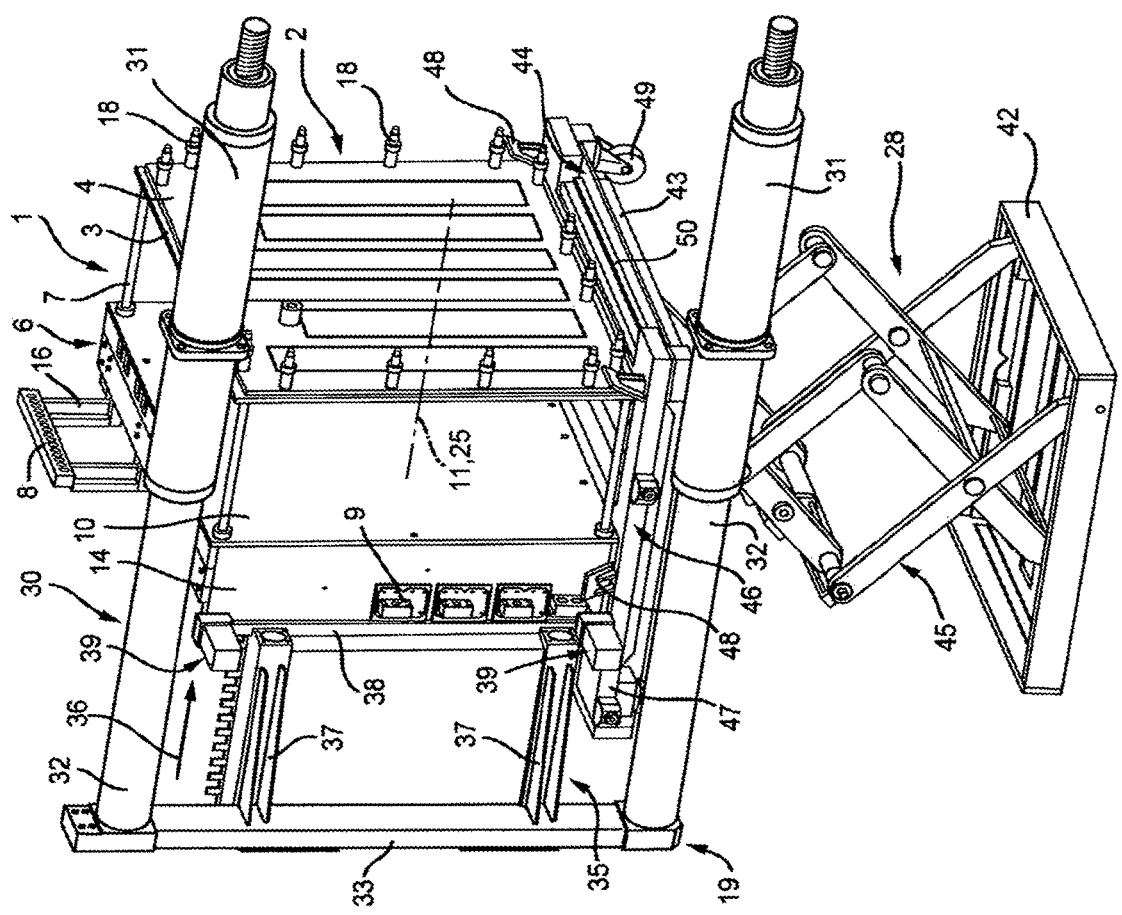
Figure 4:
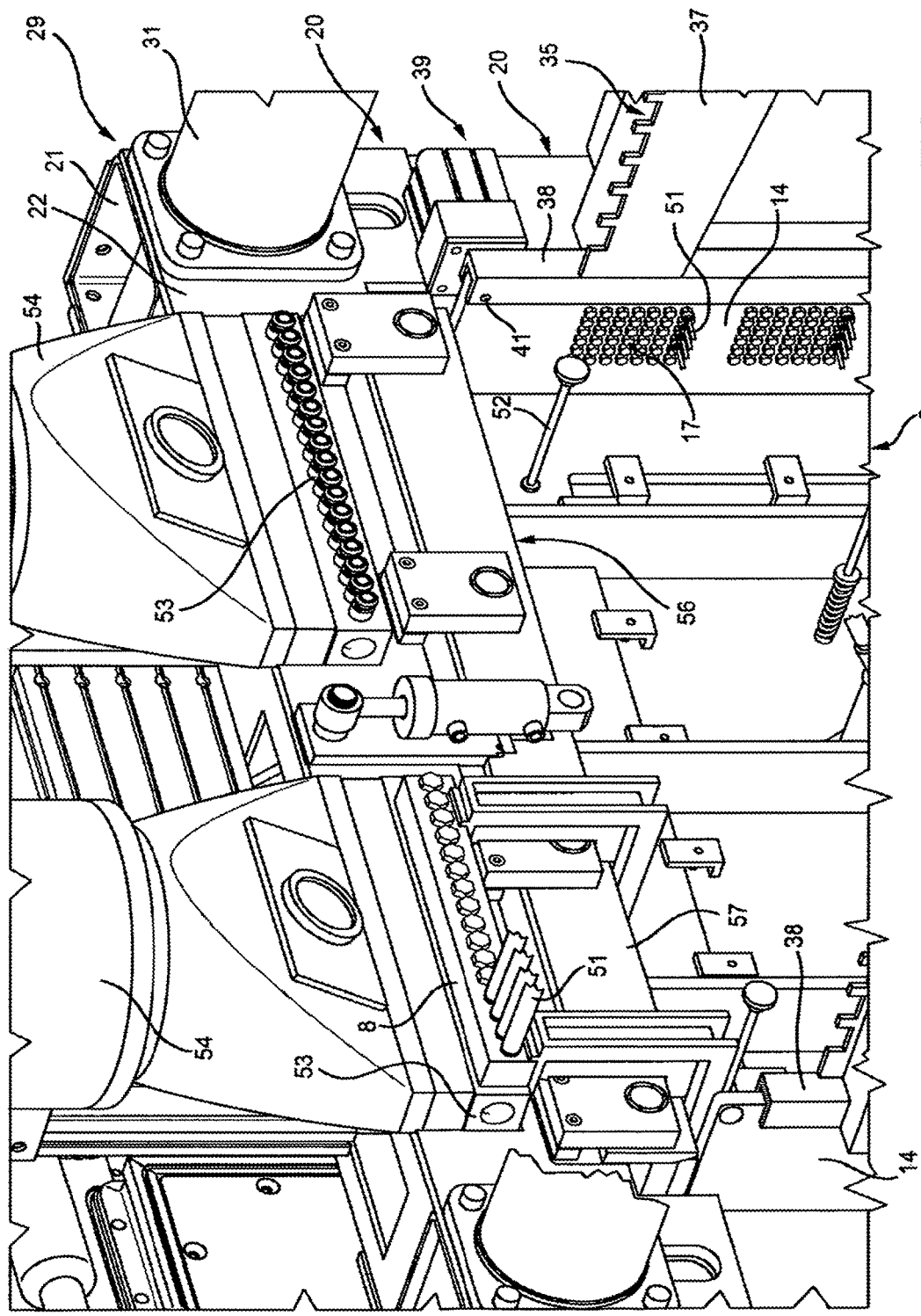
FIG. 4 shows a larger-scale first detail of FIG. 1.

Close to its lateral edge positioned at the top and horizontally in use, plate 10 is fitted with a wing 15, which extends between ribs 14, is perpendicular to plate 10 and ribs 14, and supports top front connectors 8 on a bracket 16. A variation (not shown) has two or more brackets 16, each fitted with a respective number or quantity of top front connectors 8. Lateral front connectors 9 (as seen in FIG. 3) on the other hand are located on the outer surface of one of ribs 14, and communicate with a number or quantity of through holes 17 formed in rib 14, at a minimum distance D from the free edge of rib 14.

Finally, molding unit 1 comprises a number or quantity of lock pins 18 projecting, parallel to axis 11, from the opposite side of half-mold 4 to that facing half-mold 3.

Frame 6 forms an interface connecting mold 2 to a molding machine 19. In other words, mold 2 is totally generic, and frame 6 is specially designed or configured for machine 19 to connect mold 2 to machine 19.

Figure 1:
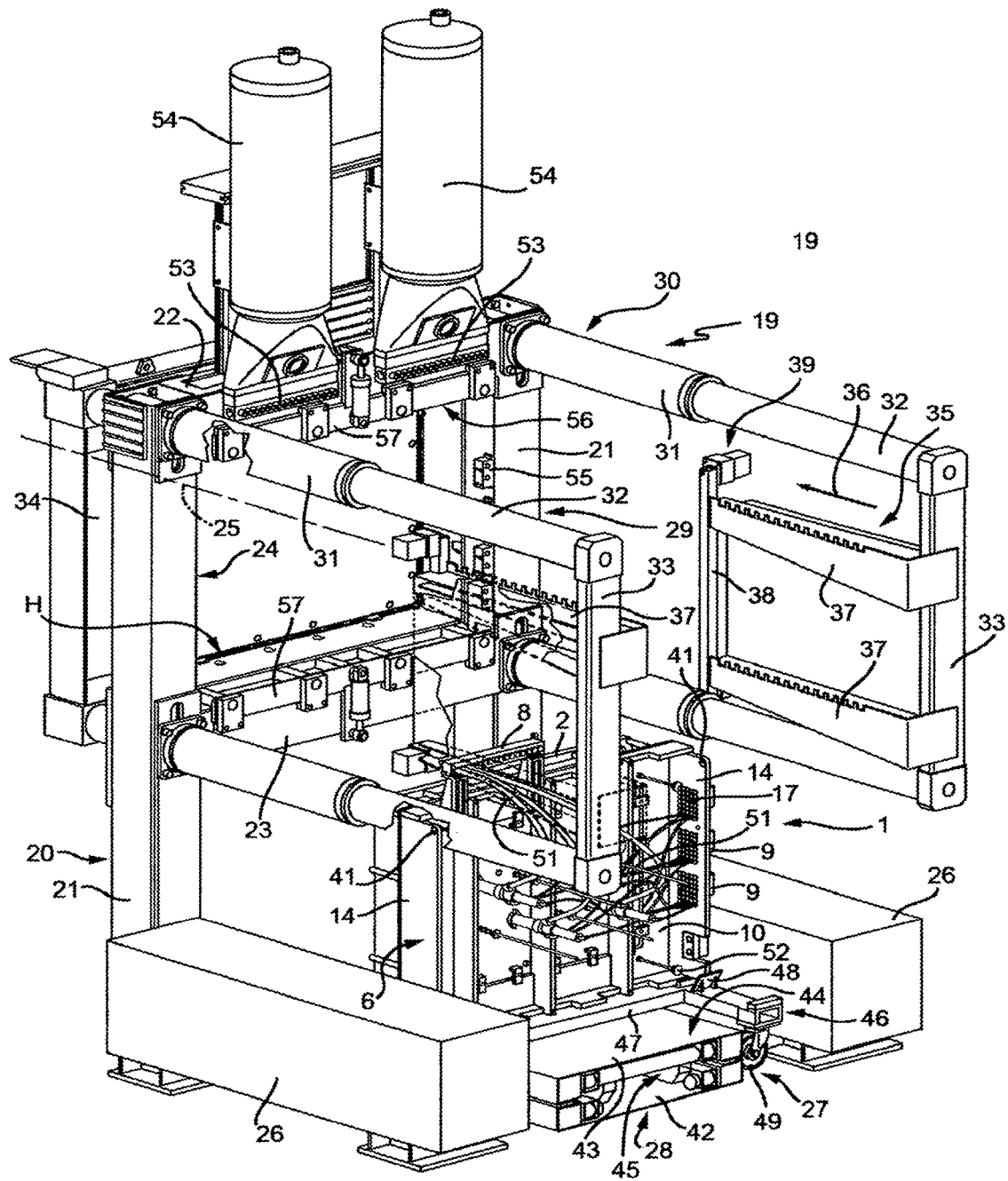
FIG. 1 shows a view in perspective, with parts removed for clarity, of a foam plastics molding machine implementing the method according to the present disclosure.

As shown in FIG. 1, machine 19 comprises an intermediate portal 20 arranged vertically and comprising two uprights 21 connected by a top cross member 22 and an intermediate cross member 23. Together with top portions of uprights 21, cross members 22 and 23 define a substantially rectangular window 24, which has a horizontal axis 25 perpendicular to portal 20, and is located a given or designated height H above a supporting surface of machine 19, hereinafter referred to as the floor.

Machine 19 also comprises two boxes 26, each of which rests on the floor, projects rearwards from a respective upright 21 in a direction perpendicular to portal 20 and parallel to axis 25, and defines, with the other box 26 and the floor, a passage 27 housing, in a fixed position, a platform 28 for lifting molding unit 1 from a lowered position on the floor to a raised position at height H. Platform 28 is narrower than passage 27 so as to define, between itself and boxes 26, two aisles of given or designated width on the floor.

Portal 20 and boxes 26 define a fixed frame 29 of machine 19, which also comprises a movable frame 30, in turn comprising two pairs of double-acting hydraulic cylinders 31 fitted to portal 20 and arranged at the four edges of a parallelogram coaxial with axis 25. More specifically, at the intersections with top cross member 22 and intermediate cross member 23, each upright 21 is fitted through with the fixed intermediate sleeves of a respective pair of hydraulic cylinders 31; and each hydraulic cylinder 31 in each pair has a through piston 32, the rear end of which, located over relative box 26, is connected to the rear end of the other piston 32 by a substantially vertical rod 33 parallel to upright 21. The front ends of all four pistons 32 are connected to respective corners of a rectangular plate 34 coaxial with axis 25, and which in use is connected releasably in known manner (not shown) to half-mold 4 utilizing pins 18.

Movable frame 30 also comprises a transfer device 35 movable with pistons 32, in a work direction 36 parallel to axis 25, between a withdrawn position, in which transfer device 35 receives and supports molding unit 1, and a forward position, in which transfer device 35 releases molding unit 1 onto fixed frame 29 at window 24.

For each rod 33, transfer device 35 comprises two brackets 37 connected rigidly to rod 33, between and parallel to relative pistons 32, and extending from rod 33 towards portal 20; and a vertical guide 38, which is integral with the free ends of relative brackets 37, is parallel to rod 33, and has a U-shaped cross section defining a longitudinal groove with its concavity facing portal 20, of a depth at most equal to distance D, and of a width approximating but no less than the thickness of ribs 14. Guides 38 are arranged symmetrically with respect to axis 25 and are at least the same length as ribs 14; and the longitudinal axes of their grooves are spaced apart by the same distance as that between the intermediate planes of ribs 14.

Each guide 38 is fitted at each end with an electromechanical locking device 39 comprising a conical bolt 40 (as seen in FIG. 7) crosswise to axis 25 and which moves through the longitudinal groove of relative guide 38 to engage a respective through hole 41 in relative rib 14 and lock molding unit 1 to relative guide 38.

Figure 2:
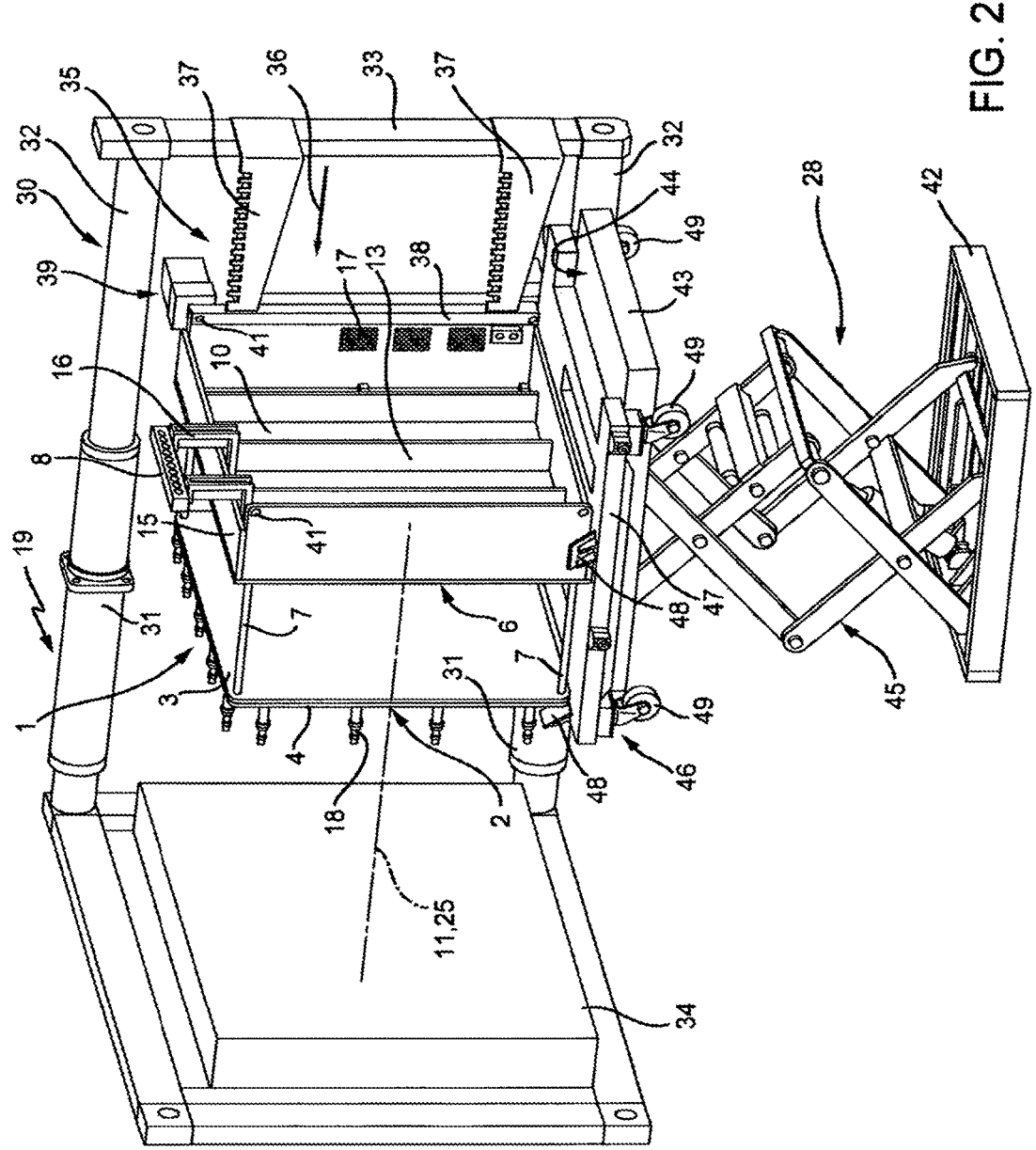
FIGS. 2 and 3 show two, respectively front and rear, views in perspective, with parts removed for clarity, of the FIG. 1 machine in a different operating configuration.

As shown in FIGS. 2 and 3, platform 28 comprises a flat base resting on and fixed to the floor; a top plate 43 with a top supporting surface 44; and a hydraulically extendible accordion frame 45 for moving plate 43 between a lowered position resting on base 42, and a raised position substantially on a level with the bottom ends of guides 38, and for keeping supporting surface 44 perpendicular to guides 38 (i.e., horizontal) at all times.

As shown in FIGS. 2 and 3, molding machine 19 also comprises a trolley 46 comprising a bed 47 of constant thickness, fitted on top with lateral and longitudinal locators 48, which cooperate with and define the position of a specific molding unit 1 on trolley 46. Bed 47 is fitted underneath with at least four wheels 49—at least two of which are castors—high enough so that the top surface of bed 47 is higher than supporting surface 44 when plate 43 is in the lowered position.

Bed 47 is wider than platform 28 and narrower than passage 27, and is configured to straddle platform 28, with wheels 49 resting on the floor inside the lateral aisles defined by platform 28 inside passage 27.

Molding machine 19 can be loaded selectively with a number or quantity of molds similar to mold 2 described, provided each is fitted with a respective interface frame 6. In various embodiments, frames 6 vary from one mold to another as regards the number or quantity and arrangement of tubular stays 7, but are identical in terms of overall size, the location and size of ribs 14, and the location of top and lateral front connectors 8 and 9, to ensure correct fitment of molding unit 1 to molding machine 19.

When not in use, each molding unit 1 is stored on a respective trolley 46 specific to and forming an integral part of molding unit 1. It should be appreciated that trolley 46 virtually defines a locating and loading dock for respective molding unit 1, and its locators are positioned with respect to bed 47 so that, by simply positioning trolley 46 astride platform 28, with its front edge contacting a fixed locator 50 (FIG. 3) on top plate 43 of platform 28, ribs 14 can be positioned directly beneath and perfectly or substantially aligned with respective guides 38.

When not in use, each molding unit 1 is stored, not only on its own trolley 46, but also ready for use (i.e., with top and lateral front connectors 8 and 9 connected by lines 51 (FIG. 1) to molding chamber 5).

When not in use and, as explained below, also during part of the step of loading molding unit 1 onto molding machine 19, half-molds 3 and 4 are locked integrally to each other by screw fasteners 52 (FIG. 1) fitted through plate 10 and removable from the outside.

To prepare molding machine 19 to produce a given or designated part, the corresponding molding unit 1 is withdrawn, on respective trolley 46, from the store; and trolley 46, still resting on the floor, is positioned astride the lowered platform 28 and resting against locator 50.

As stated, when trolley 46 is in this position and transfer device 35 is in the withdrawn position, ribs 14 of frame 6 are positioned directly beneath and aligned with respective guides 38.

On molding machine 19, substantially all of the time-consuming work to balance and set molding unit 1 (which accounts for roughly 9/10 of mold changeover time) is therefore performed "off the machine" (i.e., while molding machine 19 is operating with another mold).

Platform 28 is then activated to vertically lift top plate 43 together with molding unit 1 and trolley 46, so the free rear edges of ribs 14 slide along guides 38. Because top plate 43 keeps ribs 14 perfectly or substantially parallel to guides 38, and remains parallel to itself and perpendicular to guides 38 throughout the whole of its upward movement, ribs 14 slide accurately along guides 38 up to height H (i.e., until they are stopped), based on a position signal from position sensors (not shown), in a position in which holes 41 in ribs 14 are aligned with bolts 40 of relative locking devices 39, which are then activated to lock molding unit 1 to transfer device 35. At this point, platform 28 can be lowered to release molding unit 1 onto transfer device 35, and to lower trolley 46 onto the floor.

At this point, hydraulic cylinders 31 are activated to move movable frame 30 in work direction 36, and so move transfer device 35 into the forward position and at the same time detach plate 34 from portal 20. When transfer device 35 is in the forward position, molding unit 1, with mold 2 still closed and locked by fasteners 52, is in an intermediate position, in which it is not yet physically and functionally connected to molding machine 19, but simply extends through window 24, with top front connectors 8 positioned facing and substantially contacting outlets 53 of granular plastic material tanks 54 fitted to top cross member 22 of portal 20, and with lateral front connectors 9 positioned facing and substantially contacting operating fluid outlets 55 on one of uprights 21 of portal 20. In this intermediate position, molding unit 1 can safely be released by transfer device 35 onto fixed frame 29 by withdrawing bolts 40.

Molding unit 1 is moved in work direction 36 into its final position, connected physically and functionally to molding machine 19, by activating a locking device 56 fitted to portal 20 and comprising two horizontal bars 57. These are fitted to top and intermediate cross members 22 and 23, along the top and bottom edges of window 24 respectively, are moved to and from each other by hydraulic jacks, and each have a bevelled lateral edge 58 (FIG. 6) which, when bar 57 is moved towards the other bar 57 into a closed position and molding unit 1 is in the intermediate position, cooperates with a respective bevelled surface 59 on frame 6 to move molding unit 1 into its final forward position, and at the same time lock molding unit 1 to portal 20 and connect top front connectors 8 to outlets 53, and lateral front connectors 9 to outlets 55.

Next, hydraulic cylinders 31 are activated to restore transfer device 35 to the withdrawn position, by detaching guides 38 transversely from ribs 14, and moving plate 34 towards mold 2 to connect plate 34 in known manner to half-mold 4 utilizing pins 18.

At this point, fasteners 52 are removed, and molding machine 19 is ready to operate.

Molding unit 1 is unloaded off molding machine 19 by performing the above operations in reverse, the only difference being that, in this case, molding unit 1 is moved from its final position, connected to molding machine 19, to its intermediate position by bolts 40, which, being conical, can engage holes 41 in ribs 14 even when molding unit 1 is in the final forward position, and, as they advance inside holes 41, restore molding unit 1 to is intermediate position connected to transfer device 35.

Molding unit 1 is connected and disconnected in two stages, as described above, to ensure smooth, accurate connection and disconnection to and from molding machine 19.

Certain of the advantages of the method of loading and unloading a mold 2 on a machine such as molding machine 19 will be clear from the above description.

Firstly, mold 2 is loaded and unloaded fully automatically, with no or minimal adjustment needed to the position or balance of mold 2 as it moves to and from molding machine 19, and above all as it moves vertically inside molding machine 19.

Secondly, trolley 46, together with frame 6, forms an integral part of mold 2, and, except when mold 2 is handed over to transfer device 35, supports it safely at all times, thus safeguarding against damage to mold 2 by shock or stress as it is being handled. It is molding machine 19 itself which simultaneously receives mold 2 and trolley 46, unloads mold 2 off trolley 46, loads mold 2 onto trolley 46, maintains trolley 46 in a precise position throughout the time mold 2 is detached from trolley 46, and provides for simultaneously unloading mold 2 and trolley 46.

Besides improving safety, the above advantages also drastically reduce mold changeover time, which normally takes at least one work shift using conventional methods, but can be done is less than half an hour using the method described by way of example. For a relatively high-speed machine, such as molding machine 19, operating on average two work days with no mold changeover, this substantially amounts to doubling output.

Close analysis of the loading and unloading method described shows the above advantages originate from:

using trolley 46—with molding unit 1 set beforehand in a fixed position on it—to roll molding unit 1, on the floor, into a predetermined position with respect to molding machine 19; and using platform 28 to lift and lower molding unit 1 between the floor and height H.

It should be appreciated that it is trolley 46 that allows or enables molding unit 1 to be fully set off the machine; and it is platform 28 which, once trolley 46 is set to hold molding unit 1 in the set position on bed 47, with axis 11 positioned parallel to the bottom surface of bed 47, provides for:

substantially eliminating any errors, and the time taken to adjust them, in the position of mold 2 caused by defects on the floor or trolley 46, by simply detaching trolley 46 from the floor together with molding unit 1; and lifting and lowering trolley 46 and molding unit 1 simultaneously.

Clearly, changes may be made to the system and method as described herein without, however, departing from the scope of the accompanying Claims and without diminishing its intended advantages. It should thus be understood that various changes and modifications to the presently disclosed embodiments will be apparent to those skilled in the art and it is therefore intended that such changes and modifications be covered by the appended claims.

The invention is claimed as follows:

1. A foam plastics molding machine comprising:
   a frame including:
      a fixed frame which defines an overhead window to receive and releasably retain a molding assembly including a mold with two half molds and fitted with a mold-machine interface frame provided with plastic molding material and operating fluid inlets, wherein the fixed frame is equipped with a first coupling device configured to releasably couple a first of the half molds to the fixed frame, and
      a movable frame movably coupled to the fixed frame, said movable frame including:
         a holding member provided with a second coupling device configured to releasably couple a second of the half molds to the holding member, and
         an actuating device configured to cause the second of the half molds, when coupled to the holding member, to move with respect to the first of the half molds in a molding direction to produce plastics products;
   a dock configured to receive the molding assembly in a predetermined loading position;
   a lifting platform configured to:
      receive the dock with the molding assembly in a predetermined lifting position, and
      lift the molding assembly and the dock up to and down from a raised position facing, and spaced apart from, the overhead window; and
   a transfer device including two supporting portions arranged on opposite sides of the molding assembly at a same level as the overhead window and configured to be coupled to the molding assembly to displace, with the molding assembly, between the raised position and the overhead window.

2. The foam plastics molding machine of claim 1, wherein each of said two supporting portions of the transfer device includes a locking device configured to engage respective holes in the interface frame of the molding assembly to keep the molding assembly in the raised position when the dock is lifted down by the lifting platform.

3. The foam plastics molding machine of claim 1, which includes a guide device configured to vertically guide the molding assembly when the lifting platform lifts the molding assembly up to and down from the raised position.

4. The foam plastics molding machine of claim 1, which includes a wheeled conveyor configured to load and unload the dock with the molding assembly to and from the lifting platform.

5. The foam plastics molding machine of claim 1, which includes:
   a first positioning device configured to cause the molding assembly to be received on the dock in the predetermined loading position; and
   a second positioning device configured to cause the dock to be received on the lifting platform in the lifting position.

6. The foam plastics molding machine of claim 1, which includes a position sensing device configured to cause the lifting platform to be stopped when the molding assembly achieves the raised position.

7. The foam plastics molding machine of claim 1, wherein the dock comprises a plurality of wheels.

8. A foam plastics molding machine comprising:
   a frame including a fixed frame and a movable frame movably coupled to the fixed frame, the fixed frame defines an overhead window to receive and releasably retain a molding assembly, which includes a mold with two half molds and fitted with a mold-machine interface frame provided with a plurality of plastic molding material and operating fluid inlets, the fixed frame is equipped with a first coupling device configured to releasably couple a first of the half molds to the fixed frame, and the movable frame includes a holding member including a second coupling device configured to releasably couple a second of the half molds to the holding member and an actuating device configured to cause the second of the half molds, when locked to the holding member, to move with respect to the first of the half molds in a molding direction to produce at least one plastics product;
   a dock configured to receive the molding assembly and including a positioning device configured to hold the molding assembly in a predetermined position on the dock;
   a lifter including a lifting plate configured to receive the dock with the molding assembly thereon in a receiving station, and lift the molding assembly with the dock up to and down from a raised position facing, and spaced apart from, the overhead window;
   a transfer device including two supporting portions arranged on opposite sides of the molding assembly at the same level as the overhead window and configured to be coupled to the molding assembly to displace, with the molding assembly, between the raised position and the overhead window;
   a centering device configured to cooperate with the dock to result in the latter with the molding assembly thereon in assuming a predetermined position on the lifting plate in the receiving station; and
   a position sensing device to cause the lifting plate to be stopped when the molding assembly achieves the raised position.

9. The foam plastics molding machine of claim 8, wherein the dock comprises a plurality of wheels.

10. A foam plastics molding machine comprising:
   a frame including a fixed frame and a movable frame, wherein:
      (a) the fixed frame:
         (i) defines an overhead window, a plurality of walls of said overhead window are configured to releasably retain a molding assembly including a mold with two half molds and configured to be fitted with an interface frame having a plurality of plastic molding material and operating fluid inlets, and
         (ii) is equipped with a first coupling device configured to releasably couple a first of the two half molds to the fixed frame, and
      (b) the movable frame is configured to be movably coupled to the fixed frame and includes:
         (i) a holding member associated with a second coupling device and configured to releasably couple a second of the two half molds to the holding member, and
         (ii) an actuating device configured to cause the second of the two half molds, when coupled with the holding member, to move with respect to the first of the two half molds in a molding direction to produce at least one plastics product;

a dock configured to receive the molding assembly, said dock including a positioning device configured to hold the molding assembly in a predetermined position on the dock;

a lifter including a lifting plate configured to: receive the dock and the molding assembly in a receiving station, and lift the dock and the molding assembly up to a raised position facing, and spaced apart from, the overhead window;

a transfer device including at least two supporting portions arranged on opposite sides of the molding assembly at a same level as the overhead window and configured to be coupled to the molding assembly to displace, with the molding assembly, between the raised position and the overhead window;

a centering device configured to cooperate with the dock to result in the molding assembly being in a predetermined position on the lifting plate in the receiving station; and a position sensing device configured to cause the lifting plate to be stopped when the molding assembly achieves the raised position.

11. The foam plastics molding machine of claim 10, wherein the dock comprises a plurality of wheels.

\* \* \* \* \*